(12) United States Patent
Bernhardt

(10) Patent No.: US 11,444,312 B2
(45) Date of Patent: Sep. 13, 2022

(54) LAYERED ENERGY STORAGE DEVICES AND METHODS OF FORMING THE LAYERED ENERGY STORAGE DEVICES

(71) Applicant: The Boeing Company, Chicago, IL (US)

(72) Inventor: Roger D. Bernhardt, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 581 days.

(21) Appl. No.: 16/282,034

(22) Filed: Feb. 21, 2019

(65) Prior Publication Data

US 2020/0274185 A1 Aug. 27, 2020

(51) Int. Cl.
*H01M 10/04* (2006.01)
*H01M 10/0525* (2010.01)
*H01M 50/54* (2021.01)

(52) U.S. Cl.
CPC ... *H01M 10/0468* (2013.01); *H01M 10/0525* (2013.01); *H01M 50/54* (2021.01)

(58) Field of Classification Search
None
See application file for complete search history.

(56) References Cited

U.S. PATENT DOCUMENTS 5,156,225 A 10/1992 Murrin

OTHER PUBLICATIONS

Zhang et al., "Multifunctional structural lithium-ion battery for electric vehicles," Journal of Intelligent Material Systems and Structures, vol. 28(12), 1603-1613, 2017.
Abstract for Thomas et al., "Multifunctional Structure-Battery Materials for Enhanced Performance in Small Unmanned Air Vehicles," The American Society of Mechanical Engineers, ASME 2003 International Mechanical Engineering Congress and Exposition, Nov. 15-21, 2003.
Asp et al., "Realisation of Structural Battery Composite Materials," 20th International Conference on Composite Materials, Copenhagen, Jul. 19-24, 2015.
Ritzert et al., "Structural Batteries for Hybrid Electric Propulsion System," NASA Aeronautics Research Institute, Jul. 10, 2013.
Thomas et al., "The Design and Application of Multifunctional Structure-Battery Materials Systems," JOM, Mar. 18-24, 2005.

*Primary Examiner* — Sarah A. Slifka
(74) *Attorney, Agent, or Firm* — Dascenzo Gates Intellectual Proprty Law, P.C.

(57) ABSTRACT

Layered energy storage devices and methods of forming the layered energy storage devices are disclosed herein. The layered energy storage devices include a first device layer, a second device layer, an intermediate layer, and an interlock structure. The first device layer defines a first electrode, and the second device layer defines a second electrode. The intermediate layer extends between, and electrically separates, the first electrode and the second electrode. The intermediate layer includes an electrolyte material configured to facilitate ion transport between the first electrode and the second electrode. The interlock structure is at least partially defined by the first device layer and also by the second device layer. The interlock structure is configured to operatively interlock the first device layer, the second device layer, and the intermediate layer to one another. The methods include methods of forming the layered energy storage devices.

25 Claims, 6 Drawing Sheets

LAYERED ENERGY STORAGE DEVICES AND METHODS OF FORMING THE LAYERED ENERGY STORAGE DEVICES

FIELD

The present disclosure relates generally to layered energy storage devices and/or to methods of forming the layered energy storage devices.

BACKGROUND

Energy storage devices, such as batteries and/or capacitors, generally are fabricated as separate, or stand-alone, components. These separate and/or stand-alone components may be placed and/or positioned within an energy-consuming system that utilizes, or receives electrical energy from, the energy storage devices. While effective in certain circumstances, such a configuration has certain limitations. As an example, aircraft may be energy-consuming systems within which both space and weight are limited.

These spatial and/or weight constraints also may limit an available quantity of stored electrical energy within the aircraft and/or may dictate that the conventional energy-storage devices be positioned, within the aircraft, a significant distance away from corresponding energy-consuming systems that utilize electrical energy provided by the conventional energy-storage devices. Thus, there exists a need for layered energy storage devices, such as may be structurally embedded within energy-consuming systems, and/or for methods of forming the layered energy storage devices.

SUMMARY

Layered energy storage devices and methods of forming the layered energy storage devices are disclosed herein. The layered energy storage devices include a first device layer, a second device layer, an intermediate layer, and an interlock structure. The first device layer defines a first electrode of the layered energy storage device, and the second device layer defines a second electrode of the layered energy storage device. A first layer material of the first electrode differs from a second layer material of the second electrode. The intermediate layer extends between, and electrically separates, the first electrode and the second electrode. The intermediate layer includes an electrolyte material configured to facilitate ion transport between the first electrode and the second electrode. The interlock structure is at least partially defined by the first device layer and also by the second device layer. The interlock structure is configured to operatively interlock the first device layer, the second device layer, and the intermediate layer to one another.

The methods include defining the first device layer, defining the second device layer, and defining the intermediate layer. The methods also include operatively pressing the first device layer against a first surface of the intermediate layer while concurrently and operatively pressing the second device layer against an opposed second surface of the intermediate layer. The operatively pressing may engage the interlock structure and operatively interlock the first device layer, the second device layer, and the intermediate layer to one another such that the intermediate layer extends between, and electrically separates, the first electrode and the second electrode.

DESCRIPTION

Figure 1:
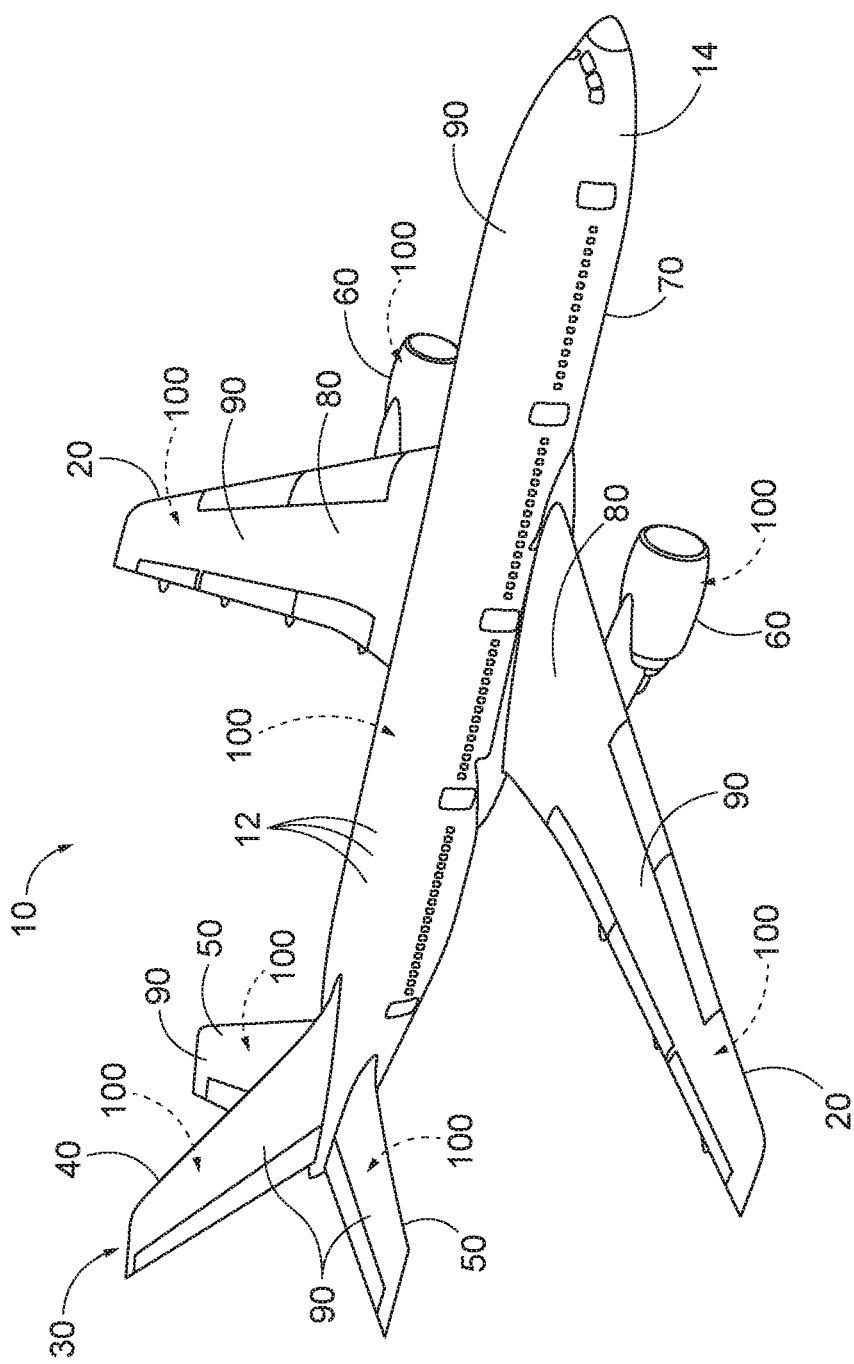
FIG. 1 is a schematic illustration of an example of an aircraft that may include and/or utilize layered energy storage devices, according to the present disclosure.

FIGS. 1-6 provide illustrative, non-exclusive examples of aircraft 10, of layered energy storage devices 100, and/or of methods 200, according to the present disclosure. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of examples of an aircraft 10 that may include and/or utilize layered energy storage devices 100 and/or that may be formed utilizing methods 200, according to the present disclosure. Aircraft 10 may include a plurality of structural components 12, examples of which include a wing 20, a tail assembly 30, a vertical stabilizer 40, a horizontal stabilizer 50, an engine 60, a fuselage 70, a spar 80, and/or a skin 90. Aircraft 10 additionally or alternatively may include sub-components and/or sub-assemblies that may form and/or define one or more of these structural components. One or more structural components 12 of aircraft 10 may form a portion of and/or may at least partially define an external surface 14 of the aircraft.

As discussed in more detail herein, layered energy storage devices 100 may be integrated into and/or may be integral with structural components 12. In addition, and as discussed, aircraft 10 may be spatially and/or weight-constrained. With this in mind, integration of layered energy storage devices 100 into necessary, or already present, structural components 12 of aircraft 10 may increase energy storage density, may decrease overall weight, and/or may decrease overall size of aircraft 10 that includes the layered energy storage devices, when compared to conventional energy storage devices, or to conventional aircraft that include conventional energy storage devices.

Figure 2:
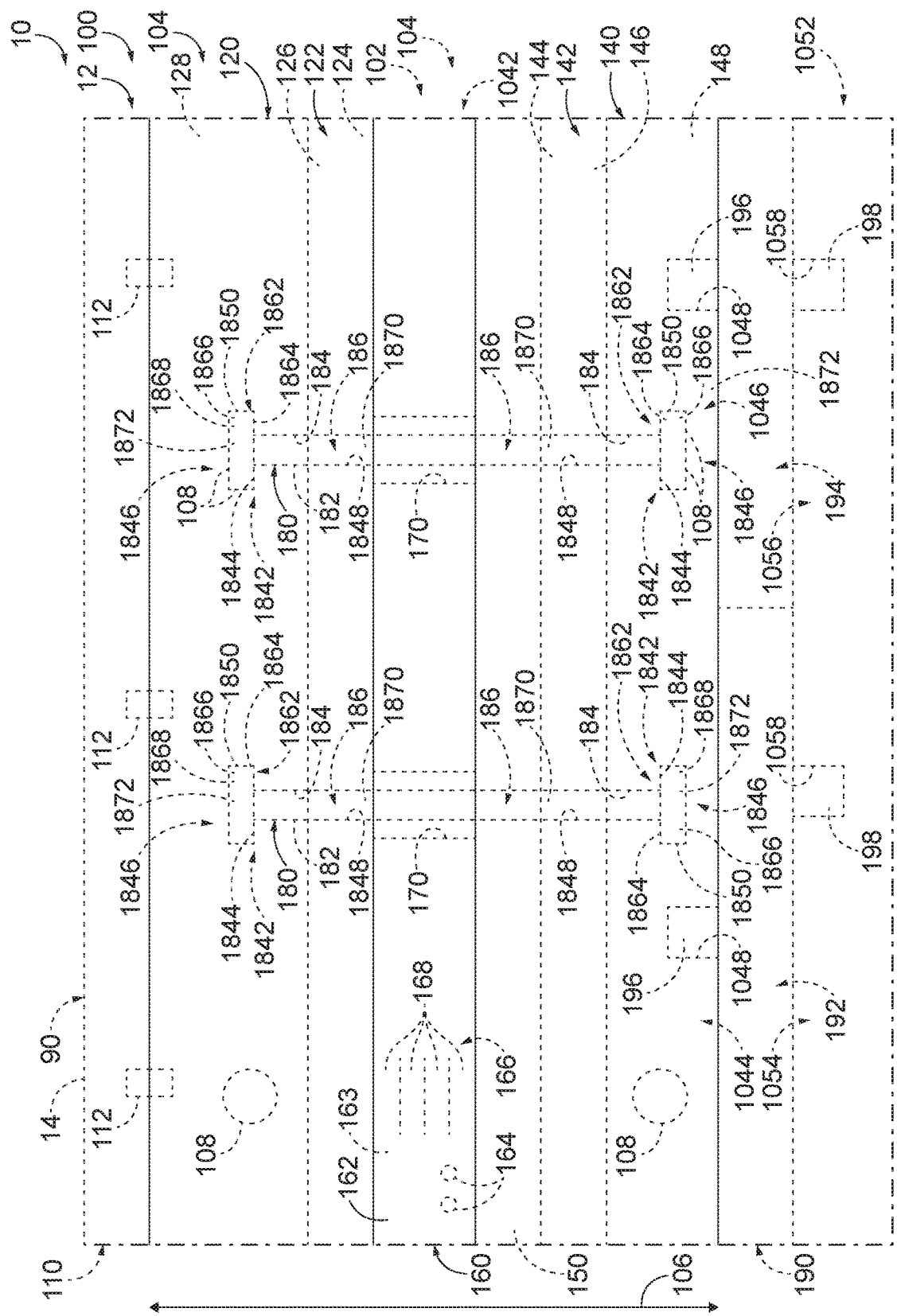
FIG. 2 is a schematic cross-sectional view illustrating examples of layered energy storage devices according to the present disclosure.
Figure 3:
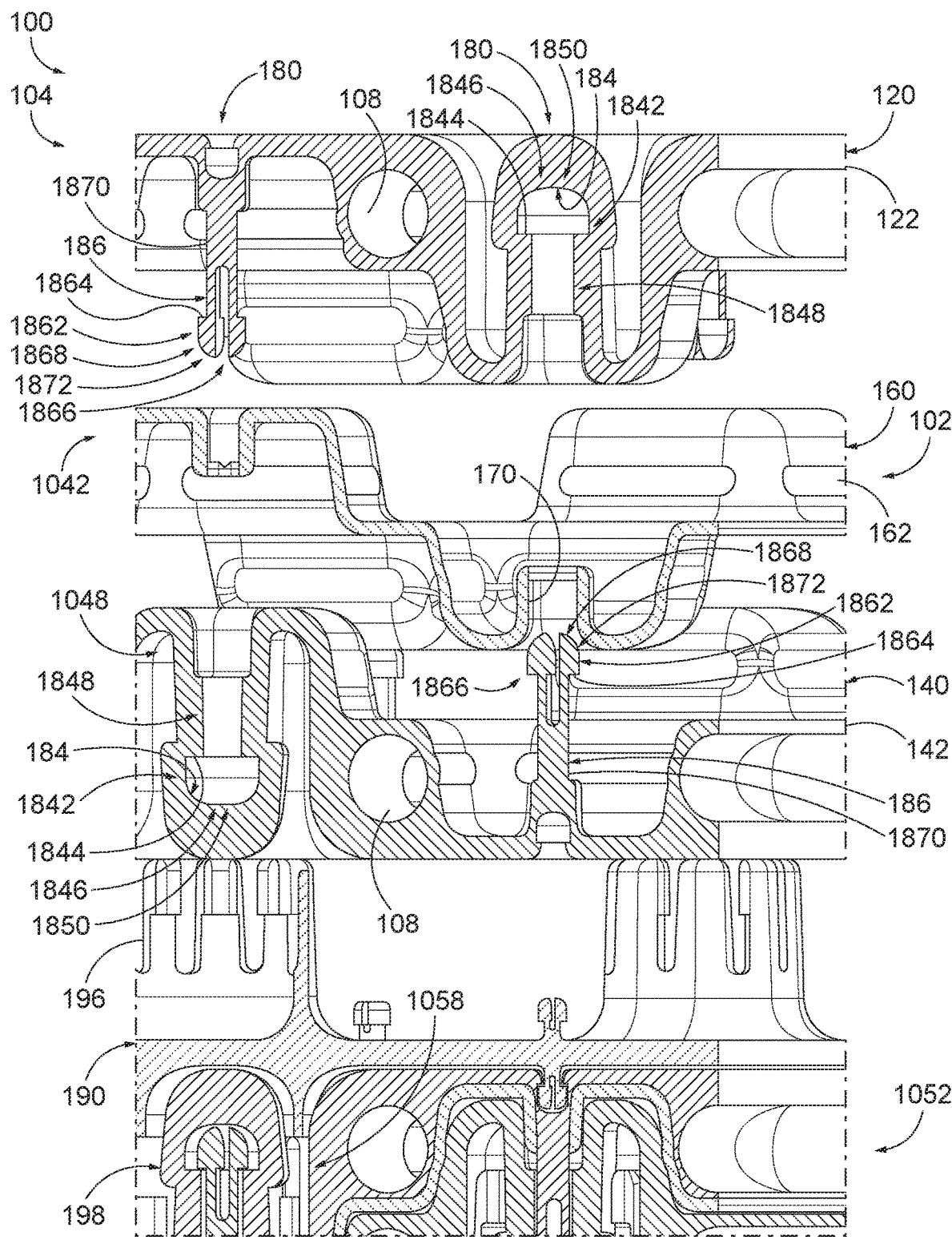
FIG. 3 is a less schematic exploded view illustrating an example of a layered energy storage device according to the present disclosure.
Figure 4:
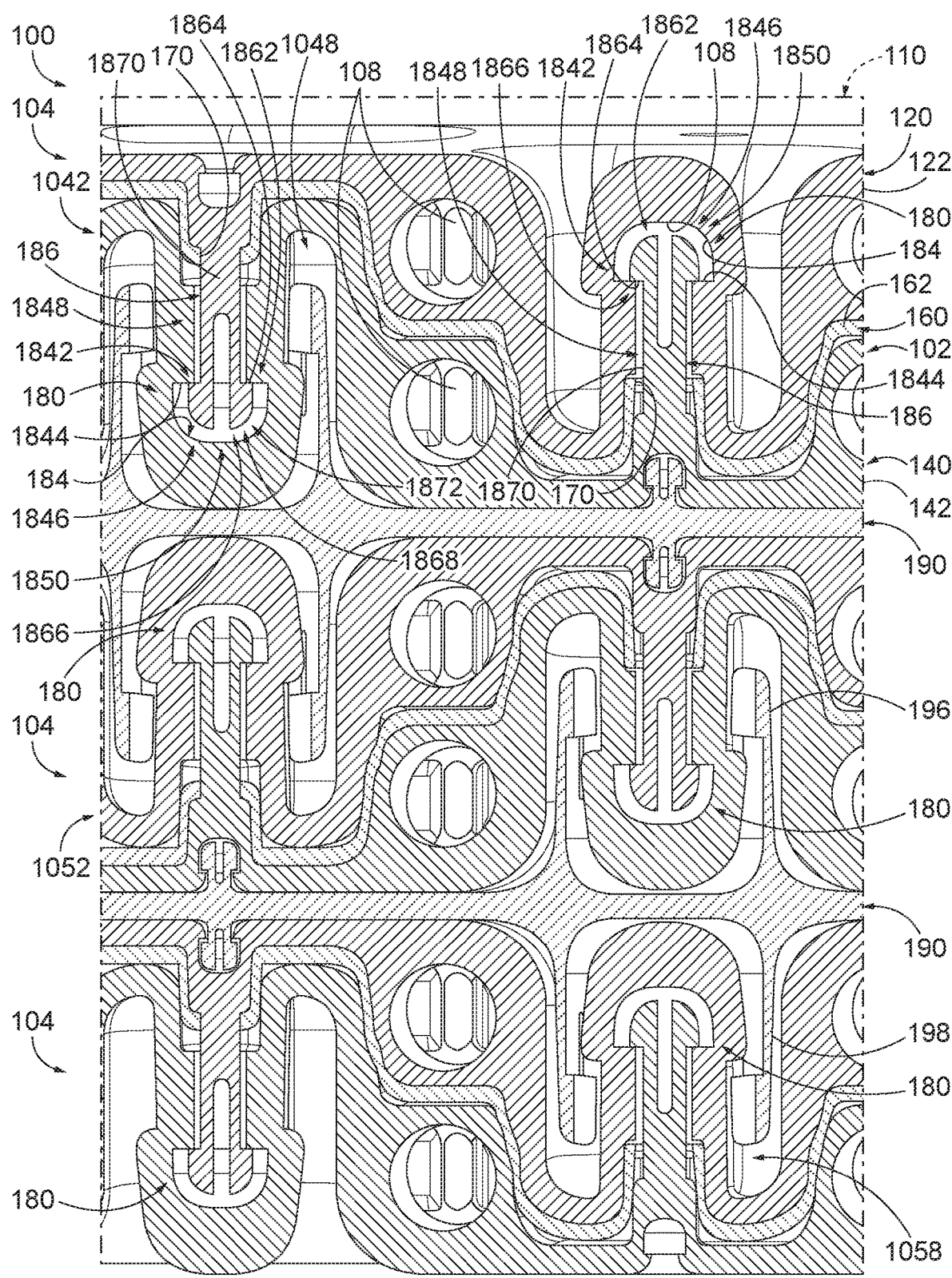
FIG. 4 is an assembled view of the layered energy storage device of FIG. 3.

FIG. 2 is a schematic cross-sectional view illustrating examples of layered energy storage devices 100 according to the present disclosure. FIG. 3 is a less schematic exploded view illustrating an example of layered energy storage device 100 according to the present disclosure, while FIG. 4 is an assembled view of layered energy storage device 100 of FIG. 3. Layered energy storage devices 100 also may be referred to herein as energy storage devices 100, layered devices 100, and/or devices 100.

As illustrated in FIGS. 2-4, devices 100 include a first device layer 120, a second device layer 140, an intermediate layer 160, and an interlock structure 180. First device layer 120 defines a first electrode 122 of device 100 and second device layer 140 defines a second electrode 142 of device 100. Intermediate layer 160 extends between first electrode 122 and second electrode 142, spatially separates first electrode 122 and second electrode 142, electrically separates first electrode 122 and second electrode 142, and/or maintains a spaced-apart relationship between first electrode 122 and second electrode 142. In addition, intermediate layer 160 includes an electrolyte material 162 that is adapted, configured, and/or selected to facilitate ion transport between first electrode 122 and second electrode 142. Interlock structure 180 is at least partially defined by first device layer 120 and also is at least partially defined by second device layer 140. In addition, interlock structure 180 is adapted, configured, designed, sized, and/or shaped to operatively interlock first device layer 120, second device layer 140, and intermediate layer 160 together and/or to one another.

As discussed, layered energy storage devices 100 may be integrated into, may form a portion of, and/or may define a portion and/or region of aircraft 10 and/or of structural component 12 of aircraft 10. In addition, layered energy storage devices 100 may, or may be utilized to, store and/or provide electrical energy, such as to one or more energy-consuming systems of aircraft 10. Stated another way, layered energy storage devices 100 may include, may be, and/or may be referred to herein as batteries, metal ion batteries, and/or lithium ion batteries. With this in mind, first electrode 122 may include and/or be a positive electrode 126 of an electrochemical cell 102. Similarly, second electrode 142 may include and/or be a negative electrode 146 of electrochemical cell 102. Electrochemical cell 102 may include and/or may be defined by first electrode 122, second electrode 142, and electrolyte material 162.

First device layer 120 also may be referred to herein as a first layer 120, a device layer 120, and/or a layer 120. Similarly, second device layer 140 also may be referred to herein as a second layer 140, a device layer 140, and/or a layer 140. In addition, first device layer 120 and second device layer 140 collectively may be referred to herein as layers 120/140.

While not required of all embodiments, it is within the scope of the present disclosure that layers 120/140 may include and/or be non-planar layers 120/140, arcuate layers 120/140, and/or curvilinear layers 120/140. Stated another way, layers 120/140 may not be planar, may not be entirely planar, and/or may include one or more regions that depart from being planar. As an example, a cross-section of layers 120/140 may have a curvilinear shape or arcuate shape, which may comprise a combination of varying curves or even frustoconical shapes, where layers 120/140 having the curvilinear shape may define a waved layer configuration. The cross-section of the layers 120/140 may have and/or exhibit the curvilinear shape relative to a plane that extends through a cross-section of layers 120/140 and/or that runs parallel to the length of layers 120/140. Similarly, layers 120/140 may have a curvilinear surface corresponding to the cross-section of the layers 120/140.

Construction of devices 100 with layers 120/140 that are non-planar, arcuate, and/or curvilinear layers 120/140 may be beneficial to the function and/or operation of devices 100. As an example, the presence of non-planar, arcuate, and/or curvilinear layers 120/140 may increase a surface area for contact, a surface area for electrical contact, and/or a surface area for ion transfer between first electrode 122 and second electrode 142 when compared to, or relative to, planar electrodes. It is within the scope of the present disclosure that layers 120/140, first electrode 122, and/or second electrode 142 may be have and/or define any suitable surface area when compared to, or relative to, planar device layers and/or planar electrodes. As examples, a ratio of a surface area of layers 120/140, of first electrode 122, and/or of second electrode 142 relative to planar device layers and/or relative to planar electrodes may be at least 1.05, at least 1.1, at least 1.15, at least 1.2, at least 1.25, at least 1.3, at least 1.4, at least 1.5, at most 4.0, at most 3.5, at most 3.0, at most 2.5, at most 2.0, and/or at most 1.5. This ratio of surface area may be selected and/or varied, within a given layered energy storage device 100, to provide a desired amount of surface area and/or to provide a desired energy storage density, or capacity, for the layered energy storage device.

As another example, non-planar, arcuate, and/or curvilinear layers 120/140 may provide improved, increased, and/or desired mechanical properties, such as a mechanical stiffness, when compared to planar device layers. In addition, these mechanical properties may be selectively and/or purposefully varied within layered energy storage devices 100, such as to provide desired mechanical properties within certain regions of the layered energy storage device.

First device layer 120 may include any suitable structure that may define first electrode 122 and/or that may at least partially define interlock structure 180. As discussed, first device layer 120 may be and/or may be referred to herein as a first curvilinear device layer 120, a first non-planar device layer 120, and/or a first arcuate device layer 120. Additionally or alternatively, first device layer 120 may include and/or be a planar first device layer 120 that includes and/or defines a first surface topography that at least partially defines interlock structure 180.

It is within the scope of the present disclosure that first device layer 120 may include and/or may be defined by a first layer material 124, as illustrated in FIG. 2. Examples of first layer material 124 include an electrically conductive first layer material 124, a metallic first layer material 124, and/or a copper first layer material 124.

First device layer 120 may include and/or be a monolithic, or a unitary, first device layer 120 that may be defined, or solely defined, by first layer material 124. Alternatively, it is within the scope of the present disclosure that first device layer 120 may include and/or be a composite first device layer 120 that may be defined by first layer material 124 and also by a first base material 128. When first device layer 120 includes both first base material 128 and first layer material 124, first layer material 124 may define first electrode 122 and may coat and/or cover first base material 128. As an example, first layer material 124 may coat and/or cover a region of first base material 128 that faces toward second electrode 142 and/or that is in electrical and/or physical contact with intermediate layer 160. Examples of first base material 128 include a dielectric first base material 128 and/or an electrically insulating first base material 128.

Second device layer 140 may include any suitable structure that may define second electrode 142 and/or that may at least partially define interlock structure 180. As discussed, second device layer 140 may be and/or may be referred to herein as a second curvilinear device layer 140, a second non-planar device layer 140, and/or a second arcuate device layer 140. Additionally or alternatively, second device layer 140 may include and/or be a planar second device layer 140 that includes and/or defines a second surface topography that at least partially defines interlock structure 180.

It is within the scope of the present disclosure that second device layer 140 may include and/or may be defined by a second layer material 144. Second layer material 144 differs from, or is chemically different from, first layer material 124. Examples of second layer material 144 include an electrically conductive second layer material 144, a metallic second layer material 144, and/or an aluminum second layer material 144.

Second device layer 140 may include and/or be a monolithic, or a unitary, second device layer 140 that may be defined, or solely defined, by second layer material 144. Alternatively, it is within the scope of the present disclosure that second device layer 140 may include and/or be a composite second device layer 140 that may be defined by second layer material 144 and also by a second base material 148. When second device layer 140 includes both second base material 148 and second layer material 144, second layer material 144 may define second electrode 142 and may coat and/or cover second base material 148. As an example, second layer material 144 may coat and/or cover a region of second base material 148 that faces toward first electrode 122 and/or that is in electrical and/or physical contact with intermediate layer 160. Examples of second base material 148 include a dielectric second base material 148 and/or an electrically insulating second base material 148.

As illustrated in dashed lines in FIG. 2, second device layer 140 may include and/or may be operatively attached to an ion host layer 150. Ion host layer 150, when present, may extend between second electrode 142 and intermediate layer 160, may spatially separate second electrode 142 from intermediate layer 160, may electrically separate second electrode 142 from intermediate layer 160, and/or may maintain a spaced-apart relationship between second electrode 142 and intermediate layer 160.

Ion host layer 150 may include and/or be a porous ion host layer 150 that may be configured to permit and/or facilitate ion transport therethrough and/or that may be configured to retain ions therein. Examples of ion host layer 150 include a ceramic ion host layer 150 and/or a fibrous ion host layer 150. Fibrous ion host layer 150, when present, may be formed and/or defined by fibers, examples of which include biological byproduct fibers, wood fibers, and/or cellulose fibers.

Ion host layer 150 may include metal ions. Examples of the metal ions include lithium ions, sodium ions, zinc ions, nickel ions, iron ions, silicon ions, copper ions, aluminum ions, and/or germanium ions.

Intermediate layer 160 may include any suitable structure that may extend between first electrode 122 and second electrode 142, that may electrically separate first electrode 122 and second electrode 142, and/or that may include electrolyte material 162. Intermediate layer 160 may be formed and/or defined by an intermediate layer material 163. As examples, intermediate layer material 163 include an ion-permeable intermediate layer material, a dielectric intermediate layer material and/or an electrically insulating intermediate layer material. More specific examples of intermediate layer 160 and/or of intermediate layer material 163 thereof include a barrier material, which spatially separates first electrode 122 and second electrode 142, and/or an ion-permeable ceramic.

Electrolyte material 162 may include and/or be any suitable material that may include ions and/or that electrically interconnect, or provide electrical conduction between, first electrode 122 and second electrode 142. As examples, electrolyte material 162 may include and/or be a liquid electrolyte material, a gel electrolyte material, a solid electrolyte material, a lattice electrolyte material, a foam electrolyte material, and/or an electrolyte material that includes a non-Newtonian fluid.

As a more specific example, electrolyte material 162 may include ions dissolved in a solvent. Examples of the ions include lithium ions, sodium ions, zinc ions, iron ions, silicon ions, germanium ions, copper ions, and/or aluminum ions. Examples of the solvent include a liquid solvent, a gel solvent, a solid solvent, a foam solvent, and/or a non-Newtonian solvent.

Electrolyte material 162 may physically, fluidly, and/or electrically contact first electrode 122 and second electrode 142. Stated another way, first electrode 122 and electrolyte material 162 together may define a first half-cell potential. Similarly, second electrode 142 and electrolyte material 162 together may define a second half-cell potential. The first half-cell potential may differ from the second half-cell potential, such as may be due to and/or caused by the difference, or the chemical difference, between first layer material 124 and second layer material 144.

Intermediate layer 160 and/or intermediate layer material 163 thereof may include and/or be a structural intermediate layer. Stated another way, intermediate layer 160 may provide structural integrity for device 100 and/or may retain a spaced-apart relationship between first electrode 122 and second electrode 142.

As illustrated in dashed lines in FIG. 2, intermediate layer 160 may include pores 164. Pores 164, when present, may be sized and/or configured to permit and/or to facilitate ion transport through intermediate layer 160 and/or between first electrode 122 and second electrode 142. When intermediate layer 160 includes pores 164, the pores may have and/or define any suitable diameter, average diameter, effective diameter, and/or average effective diameter. As used herein, the phrase, "effective diameter" refers to the diameter of a circle with the same area as the cross-sectional area of pores 164. Examples of the diameter of pores 164 include diameters of at least 1 Angstrom, at least 2 Angstroms, at least 5 Angstroms, at least 10 Angstroms, at least 20 Angstroms, at least 30 Angstroms, at least 40 Angstroms, at least 50 Angstroms, at least 60 Angstroms, at least 80 Angstroms, at least 100 Angstroms, at most 250 Angstroms, at most 225 Angstroms, at most 200 Angstroms, at most 175 Angstroms, at most 150 Angstroms, at most 125 Angstroms, and/or at most 100 Angstroms.

As also illustrated in dashed lines in FIG. 2, intermediate layer 160 may include and/or may define a layered battery 166. As an example, intermediate layer 160 may include a plurality of sub-layers 168. The plurality of sub-layers 168 may include a plurality of ion-permeable sub-layers and a plurality of sub-layer electrodes. In this example, at least one ion-permeable sub-layer in the plurality of ion-permeable sub-layers separates a corresponding adjacent pair of sub-layer electrodes and include a sub-layer electrolyte material configured to facilitate ion transport between the corresponding adjacent pair of sub-layer electrodes.

Interlock structure 180 may include any suitable structure that is at least partially defined by first device layer 120 and by second device layer 140 and/or that is configured to operatively interlock first device layer 120, second device layer 140, and intermediate layer 160. In addition, interlock structure 180 may operatively interlock first device layer 120, second device layer 140, and intermediate layer 160 in any suitable manner.

As an example, interlock structure may be configured to maintain contact, direct physical contact, and/or electrical contact between at least a region of first electrode 122 and a first corresponding region of intermediate layer 160. Similarly, interlock structure may be configured to maintain contact, direct physical contact, and/or electrical contact between at least a region of second electrode 142 and a second corresponding region of intermediate layer 160. As another example, a region of interlock structure 180 that is defined by first device layer 120 may be shaped to define an interference fit and/or a snap-lock fit with a region of interlock structure 180 that is defined by second device layer 140.

It is within the scope of the present disclosure that at least a portion of interlock structure 180 may extend through intermediate layer 160. With this in mind, intermediate layer 160 may define an aperture 170, and the portion of interlock structure 180 that extends through intermediate layer 160 may extend through the aperture. Stated another way, the portion of interlock structure 180 that is defined by first device layer 120 may contact, may directly contact, may physically contact, and/or may interlock with the portion of interlock structure 180 that is defined by second device layer 140.

Interlock structure 180 may include a plurality of interlock sub-structures 182. Interlock sub-structures 182 may be spaced-apart within device 100 and/or may define a repeating pattern across a surface of and/or along a length of device 100. When interlock structure 180 includes interlock sub-structures 182, each interlock sub-structure 182 may be configured to operatively interlock a corresponding region of first device layer 120, a corresponding region of second device layer 140, and a corresponding region of intermediate layer 160 to one another.

In one example, and as perhaps best illustrated by FIGS. 3-4, interlock structure 180 includes a recess 184 and a projection 186. Recess 184 is defined by and/or within one of first device layer 120 and second device layer 140 and extends away from intermediate layer 160. Projection 186 is defined by the other of the first device layer and the second device layer and extends through intermediate layer 160, through aperture 170, and/or away from the layer (i.e., the other of the first device layer and the second device layer) that defines the projection.

Projection 186 may be configured to interface and/or interlock with and/or within recess 184. As an example, recess 184 may include a recess interlock region 1842 and projection 186 may include a projection interlock region 1862. In this configuration, recess interlock region 1842 and projection interlock region 1862 may be configured to operatively interlock with one another, such as to operatively interlock first device layer 120, second device layer 140, and intermediate layer 160.

As a more specific example, recess interlock region 1842 may include a recess edge 1844 that may extend perpendicular, or at least substantially perpendicular, to an elongate axis of recess 184. As another more specific example, projection interlock region 1862 may include a projection edge 1864 that may extend perpendicular, or at least substantially perpendicular, to an elongate axis of projection 186.

As yet another more specific example, projection interlock region 1862 may include a barb 1866. Stated another way, recess 184 may include and/or be a mushroom-shaped, or at least partially mushroom-shaped, recess region 1846. Similarly, projection 186 may include and/or be a mushroom-shaped, or at least partially mushroom-shaped, projection 1868 that may be shaped to interlock with mushroom-shaped recess region 1846.

As another example, recess 184 may include an elongate recess cavity 1848, which extends away from intermediate layer 160, and an expanded recess region 1850, which may be defined on an end of the elongate recess cavity that is distal intermediate layer 160. Similarly, projection 186 may include an elongate projection shaft 1870 that extends through intermediate layer 160, through aperture 170, and/or within elongate recess cavity 1848. In this example, projection 186 also may include a bulbous projection end 1872 that may extend within expanded recess region 1850. In this example, a transverse cross-sectional dimension, or a maximum transverse cross-sectional dimension, of bulbous projection end 1872 may be greater than a transverse cross-sectional dimension of elongate projection shaft 1870, greater than a maximum transverse cross-sectional dimension of elongate projection shaft 1870, greater than a transverse cross-sectional dimension of elongate recess cavity 1848, and/or greater than a maximum transverse cross-sectional dimension of elongate recess cavity 1848.

It is within the scope of the present disclosure that device 100 and/or interlock structure 180 thereof may be configured to maintain electrical separation between first electrode 122 and second electrode 142. Stated another way, and within devices 100 and/or interlock structures 180, first electrode 122 may not directly contact second electrode 142 and/or interlock structures 180 may operatively interlock first device layer 120, second device layer 140, and intermediate layer 160 without establishing direct electrical contact between first electrode 122 and second electrode 142. As an example, a region of first device layer 120 and/or of second device layer 140 that defines interlock structure 180, that defines recess 184, and/or that defines projection 186 may be electrically insulating and/or may be formed from an electrically insulating material.

It is within the scope of the present disclosure that first device layer 120, second device layer 140, intermediate layer 160, and/or interlock structure 180 together may form and/or define a battery cell 104. In some examples, battery cell 104 may include and/or be a first battery cell 1042 of layered energy storage device 100; and the layered energy storage device also may form, define, and/or include a second battery cell 1052. Second battery cell 1052, when present, may be similar, or at least substantially similar, to first battery cell 1042. Stated another way, a construction of second battery cell 1052 may be similar, at least substantially similar, or even identical to that of first battery cell 1042. Stated another way, layered energy storage devices 100 may include a plurality of battery cells 104, such as first battery cell 1042 and/or second battery cell 1052, and each battery cell 104 may include a corresponding first device layer 120, a corresponding second device layer 140, a corresponding intermediate layer 160, and/or a corresponding interlock structure 180.

The plurality of battery cells 104 may include any suitable number of battery cells 104, such as may produce and/or generate a desired structural integrity for layered energy storage devices 100 and/or that may produce, generate, and/or provide a desired amount, or quantity, of energy storage within the layered energy storage device. As examples, the plurality of battery cells 104 may include at least 2, at least 4, at least 6, at least 8, at least 10, at most 20, at most 15, at most 10, at most 8, at most 6, and/or at most 4 battery cells.

In examples of layered energy storage devices 100 that include the plurality of battery cells 104 and/or that include both first battery cell 1042 and second battery cell 1052, the layered energy storage devices also may include an attachment layer 190. Attachment layer 190, when present, may operatively interconnect, or interlock, first battery cell 1042 and second battery cell 1052. Additionally or alternatively, layered energy storage devices 100 may include a plurality of attachment layers 190, with each attachment layer 190 operatively interconnecting, or interlocking, a corresponding adjacent pair of battery cells 104.

As illustrated in FIG. 2, attachment layers 190 may include a dielectric attachment layer region 192. Dielectric attachment layer region 192, when present may, or may be configured to, electrically isolate a first isolated region 1044 of first battery cell 1042 from a corresponding second isolated region 1054 of second battery cell 1052. As also illustrated in FIG. 2, attachment layers 190 may include an electrically conductive attachment layer region 194. Electrically conductive attachment layer region 194, when present, may be configured to electrically interconnect a first connected region 1046 of first battery cell 1042 to a corresponding second connected region 1056 of second battery cell 1052.

The combination of dielectric attachment layer region 192 and electrically conductive attachment layer region 194 may permit and/or facilitate utilization of attachment layer 190 as an electrical interconnect, similar to a printed circuit board. Such an electrical interconnect may selectively and/or flexibly permit various series, parallel, and/or series-parallel connections among and/or between battery cells 104 of layered energy storage device 100. As an example, electrically conductive attachment layer region 104 may electrically interconnect first electrode 122 of first battery cell 1042 to second electrode 142 of second battery cell 1052. As another example, electrically conductive attachment layer region 194 may electrically interconnect first electrode 122 of first battery cell 1042 to first electrode 122 of second battery cell 1052.

Attachment layer 190 may operatively interconnect battery cells 104 in any suitable manner. As an example, first battery cell 1042 may include and/or define a first cell recess 1048 that extends into the first battery cell. Similarly, second battery cell 1052 may include and/or define a second cell recess 1058 that extends into the second battery cell. In this configuration, attachment layer 190 may include a first attachment projection 196 and a second attachment projection 198. First attachment projection 196 may project into first cell recess 1048 and/or may be configured to operatively interlock first battery cell 1042 to attachment layer 190. Similarly, second attachment projection 198 may project into second cell recess 1058 and/or may be configured to operatively interlock second battery cell 1052 to attachment layer 190. First attachment projection 196 and second attachment projection 198 may extend in opposite, or in at least substantially opposite, directions. Similarly, first cell recess 1048 and second cell recess 1058 may extend in opposite, or in at least substantially opposite, directions and/or may extend away from attachment layer 190.

As discussed herein, layered energy storage devices 100 may form a portion of and/or may define the skin of the aircraft. With this in mind, and as illustrated in dashed lines in FIG. 2, layered energy storage devices 100 may include an external skin layer 110. External skin layer 110, when present, may define external surface 14 of aircraft 10. As also illustrated in dashed lines in FIG. 2, a skin interlock structure 112 may, or may be utilized to, operatively interlock external skin layer 110 to first device layer 120, to second device layer 140, and/or to intermediate layer 160.

As illustrated in dashed lines in FIG. 2 and in solid lines in FIGS. 3-4, layered energy storage devices 100 may include one or more cavities 108. Cavities 108, when present, may be shaped, sized, and/or positioned to provide a desired level of mechanical flexibility in and/or within layered energy storage devices 100.

It is within the scope of the present disclosure that layered energy storage devices 100, including first device layer 120, second device layer 140, intermediate layer 160, and/or interlock structure 180 thereof, may be adapted, configured, sized, and/or shaped to distribute, or to spread, a physical load that is applied to the layered energy storage device. This may include distribution of the load in at least two, or even in three, dimensions. Such load distribution may be permitted, facilitated, and/or enhanced by the shape of the various layers that comprise layered energy storage device 100, and the shape of these layers may be selected and/or designed to provide desired load distribution properties.

It is also within the scope of the present disclosure that layered energy storage devices 100 may be thin and/or sheet-like layered energy storage devices 100. As an example, and as illustrated in FIG. 2, a thickness 106 of layered energy storage devices 100 may be defined between a surface of first device layer 120 that is opposed to first electrode 122 and a surface of second device layer 140 that is opposed to second electrode 142. This thickness 106 may be relatively small, and examples of thickness 106 include thicknesses of at least 0.5 millimeters (mm), at least 0.6 mm, at least 0.7 mm, at least 0.8 mm, at least 0.9 mm, at least 1.0 mm, at least 1.1 mm, at least 1.2 mm, at least 1.3 mm, at least 1.4 mm, at least 1.5 mm, at most 5 mm, at most 4.5 mm, at most 4 mm, at most 3.5 mm, at most 3 mm, at most 2.5 mm, at most 2.25 mm, at most 2.0 mm, at most 1.9 mm, at most 1.8 mm, at most 1.7 mm, and/or at most 1.6 mm.

Stated another way, a maximum extend of layered energy storage devices 100 may be greater than thickness 106. Examples of a ratio of the maximum extend of layered energy storage devices 100 to thickness 106 include ratios of at least 10, at least 50, at least 100, at least 250, at least 500, at least 1000, at least 2500, at least 5000, and/or at least 10,000.

Figure 5:
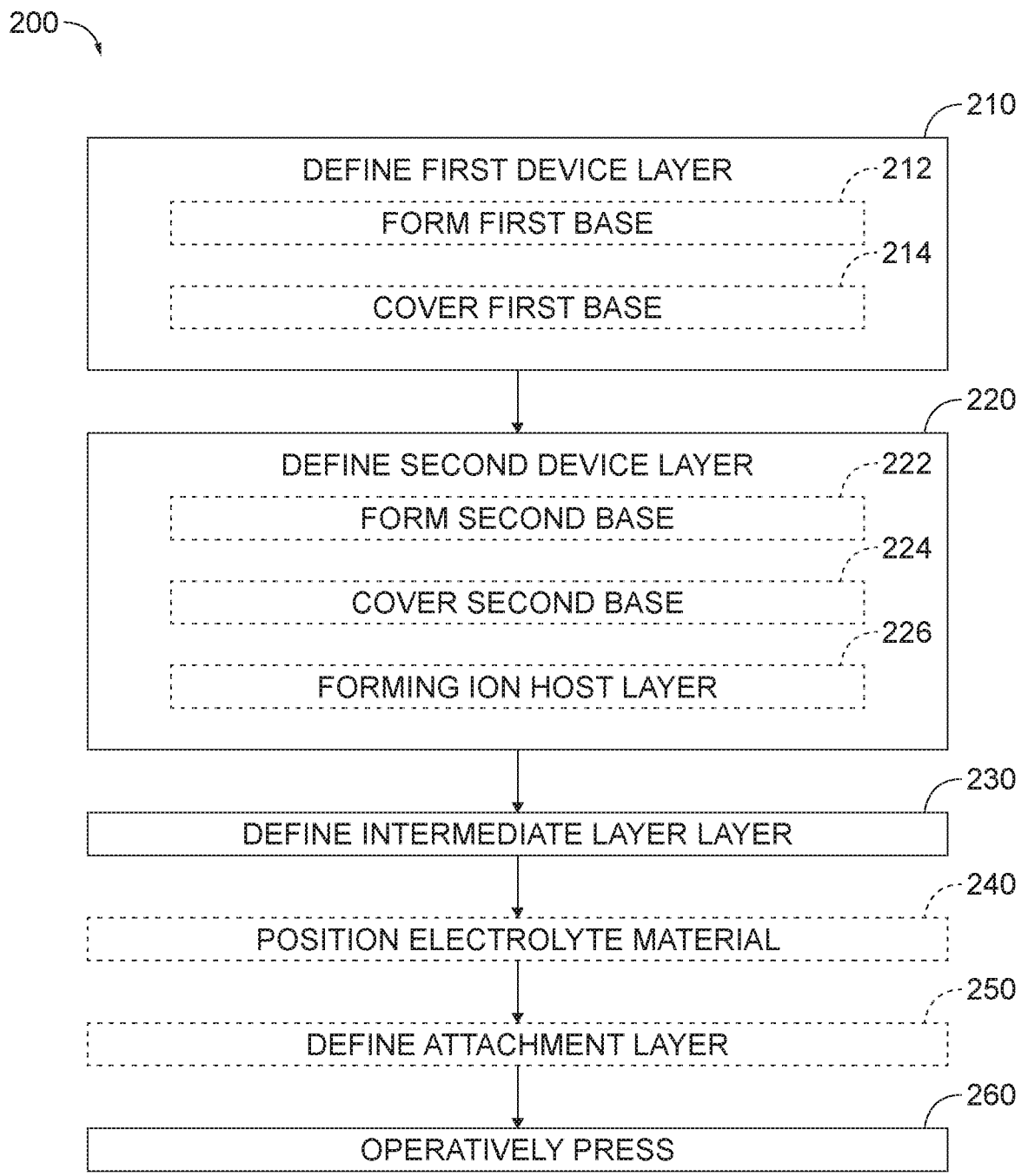
FIG. 5 is a flowchart depicting methods of forming a layered energy storage device, according to the present disclosure.
Figure 6:
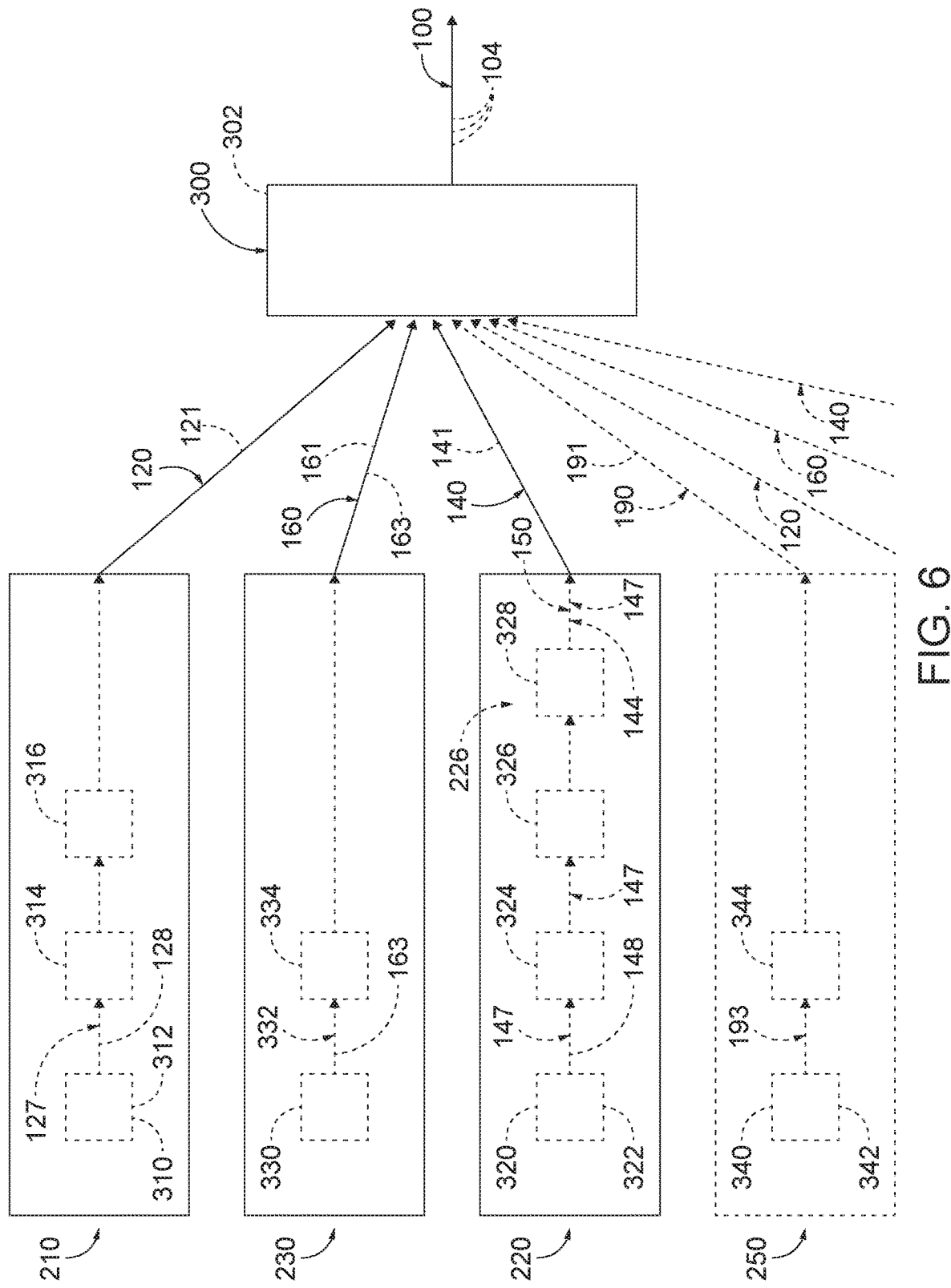
FIG. 6 is a schematic illustration of a process flow that may be utilized with and/or that may result from the methods of FIG. 5.

FIG. 5 is a flowchart depicting methods 200 of forming a layered energy storage device according to the present disclosure, such as layered energy storage device 100 of FIGS. 1-4. FIG. 6 is a schematic illustration of a process flow 290 that may be utilized with and/or that may result from methods 200 of FIG. 5. As illustrated in FIGS. 2-4 and discussed in more detail herein, the layered energy storage device may include a first device layer, such as first device layer 120 of FIGS. 2-4, and a second device layer, such as second device layer 140 of FIGS. 2-4. The layered energy storage device also may include an intermediate layer, such as intermediate layer 160 of FIGS. 2-4, and an interlock structure, such as interlock structure 180 of FIGS. 2-4.

Methods 200 include defining the first device layer at 210, defining the second device layer at 220, and defining the intermediate layer at 230. Methods 200 also may include positioning an electrolyte material at 240 and defining an attachment layer at 250 and include operatively pressing at 260.

Defining the first device layer at 210 may include forming and/or defining any suitable first device layer in any suitable manner. As an example, the defining at 210 may include defining a sheet 121 of first device layer 120, as schematically illustrated in FIG. 6. Sheet 121 may be thin, resilient, and/or flexible, such as may permit and/or facilitate utilization of sheet 121 in a remainder of methods 200 of FIG. 5 and/or within process flow 290 of FIG. 6.

As another example, the defining at 210 may include forming a first base, as indicated at 212 in FIG. 5, and subsequently covering the first base with a first layer material, as indicated at 214 in FIG. 5, to form and/or define a first electrode of the layered energy storage device. The forming at 212 may be performed in any suitable manner. As examples, the forming at 212 may include utilizing an additive manufacturing process, utilizing a continuous liquid interface printing process, utilizing a metal stamping process, utilizing a rolling process, utilizing an extruding process, utilizing a metal forming process, and/or utilizing a metal expanding process to form and/or define the first base.

As another example, the forming at 210 may include forming an uncured first base and subsequently curing the uncured first base to form and/or define the first base. The curing the uncured first base may include heating the uncured first base. Additionally or alternatively, the curing the uncured first base may include compressing the uncured first base between a pair of heated first base compression rollers. This may include defining at least one fine, or detailed, feature of the first base during and/or responsive to the compressing.

The covering at 214 may include covering the first base with the first layer material in any suitable manner. As examples, the covering at 214 may include coating the first base with the first layer material, electroplating the first base with the first layer material, and/or pressing a film, or a foil, of the first layer material against the first base.

The defining at 210 is schematically illustrated in FIG. 6. As illustrated therein, the defining at 210 may produce and/or generate first device layer 120 and/or sheet 121 of first device layer 120. As also illustrated, the defining at 210 may utilize an additive manufacturing process 310 and/or a continuous liquid interface printing process 312 to produce and/or generate a first base 127 that may be formed from first base material 128. First base 127 initially may be an uncured first base, and the defining at 210 may include utilizing a first base curing structure 314 to cure the uncured first base and form the first base. Examples of first base curing structure 314 include any suitable heating assembly, such as the pair of heated first base compression rollers.

As further illustrated, a first layer material covering structure 316 may be utilized to cover first base 127 with first layer material 124, thereby producing and/or generating first device layer 120. Examples of first layer material covering structure 316 include any suitable coating system, electroplating system, and/or pressing system that may press the film and/or foil of first layer material 124 against first base 127.

Examples of the first electrode are disclosed herein with reference to first electrode 122 of FIGS. 2-4. Examples of the first layer material are disclosed herein with reference to first layer material 124 of FIGS. 2-4. Examples of the first base material are disclosed herein with reference to first base material 128 of FIGS. 2-4.

Defining the second device layer at 220 may include forming and/or defining any suitable second device layer in any suitable manner. As an example, the defining at 220 may include defining a sheet 141 of second device layer 140, as schematically illustrated in FIG. 6. Sheet 141 may be thin, resilient, and/or flexible, such as may permit and/or facilitate utilization of sheet 141 in a remainder of methods 200 of FIG. 5 and/or within process flow 290 of FIG. 6.

As another example, the defining at 220 may include forming a second base, as indicated at 222 in FIG. 5, and subsequently covering the second base with a second layer material, as indicated at 224 in FIG. 5, to form and/or define a second electrode of the layered energy storage device. The forming at 222 may be performed in any suitable manner. As examples, the forming at 222 may include utilizing an additive manufacturing process, utilizing a continuous liquid interface printing process, utilizing a metal stamping process, utilizing a rolling process, utilizing an extruding process, utilizing a metal forming process, and/or utilizing a metal expanding process to form and/or define the second base.

As another example, the forming at 220 may include forming an uncured second base and subsequently curing the uncured second base to form and/or define the second base. The curing the uncured second base may include heating the uncured second base. Additionally or alternatively, the curing the uncured second base may include compressing the uncured second base between a pair of heated second base compression rollers. This may include defining at least one fine, or detailed, feature of the second base during and/or responsive to the compressing.

The covering at 224 may include covering the second base with the second layer material in any suitable manner. As examples, the covering at 224 may include coating the second base with the second layer material, electroplating the second base with the second layer material, and/or pressing a film, or a foil, of the second layer material against the second base.

The defining at 220 is schematically illustrated in FIG. 6. As illustrated therein, the defining at 220 may produce and/or generate second device layer 140 and/or sheet 141 of second device layer 140. As also illustrated, the defining at 220 may utilize an additive manufacturing process 320 and/or a continuous liquid interface printing process 322 to produce and/or generate a second base 147 that may be formed from a second base material 148. Second base 147 initially may be an uncured second base, and the defining at 220 may include utilizing a second base curing structure 324 to cure the uncured second base and form the second base. Examples of second base curing structure 324 include any suitable heating assembly, such as the pair of heated second base compression rollers.

As further illustrated, a second layer material covering structure 326 may be utilized to cover second base 147 with second layer material 144, thereby producing and/or generating second device layer 140. Examples of second layer material covering structure 326 include any suitable coating system, electroplating system, and/or pressing system that may press the film and/or foil of second layer material 144 against second base 147.

Examples of the second electrode are disclosed herein with reference to second electrode 142 of FIGS. 2-4. Examples of the second layer material are disclosed herein with reference to second layer material 144 of FIGS. 2-4. Examples of the second base material are disclosed herein with reference to second base material 148 of FIGS. 2-4.

Returning to FIG. 5, and as illustrated in dashed lines, the defining at 220 also may include forming an ion host layer, as indicated at 226. The forming at 226 may include forming the ion host layer on and/or in contact with the second electrode and may be performed in any suitable manner. As an example, the forming at 226 may include pressing the ion host layer against the second electrode. As another example, the forming at 226 may include heating the ion host layer to cure the ion host layer. Examples of the ion host layer are disclosed herein with reference to ion host layer 150 of FIGS. 2-4.

The forming at 226 is schematically illustrated in FIG. 6. As illustrated therein, an ion host layer forming structure 328 may be utilized to form and/or define an ion host layer 150 and/or to position the ion host layer in contact with the second electrode. An example of ion host layer forming structure 328 includes a pair of rollers.

Defining the intermediate layer at 230 may include forming and/or defining any suitable intermediate layer in any suitable manner. As an example, the defining at 230 may include defining a sheet 161 of intermediate layer 160 and/or defining sheet 161 of intermediate layer material 163, as schematically illustrated in FIG. 6. As another example, the defining at 230 may include providing sheet 161 of the intermediate layer material. Sheet 161 may be thin, resilient, and/or flexible, such as may permit and/or facilitate utilization of sheet 161 in a remainder of methods 200 of FIG. 5 and/or within process flow 290 of FIG. 6.

The defining at 230 may include defining in any suitable manner. As an example, the defining at 230 may include pressing the sheet of the intermediate layer material between a pair of opposed intermediate layer rollers. This may include forming and/or defining at least one feature of the intermediate layer with, via, or as a result of the pressing. An example of the fine feature includes an aperture, such as aperture 170 of FIGS. 2-4. Examples of the intermediate layer material are disclosed herein with reference to intermediate layer material 163 of FIG. 2.

The defining at 230 is illustrated schematically in FIG. 6. As illustrated therein, a sheet 332 of intermediate layer material 163 may be provided from an intermediate layer material source 330. An intermediate layer forming structure 334 may receive sheet 332 and may form sheet 332, such as to define intermediate layer 160 and/or sheet 161.

Positioning the electrolyte material at 240 may include positioning any suitable electrolyte material within the intermediate layer and/or between the first electrode and the second electrode. Examples of the electrolyte material are disclosed herein.

It is within the scope of the present disclosure that the positioning at 240 may be performed with any suitable timing and/or sequence during methods 200. As examples, the positioning at 240 may be performed subsequent to the operatively pressing at 260, prior to the operatively pressing at 260, and/or concurrently with the defining at 230.

Operatively pressing at 260 may include operatively pressing the first device layer against a first surface of the intermediate layer while concurrently and operatively pressing the second device layer against an opposed second surface of the intermediate layer. This may include operatively pressing to engage the interlock structure and/or to operatively interlock the first device layer, the second device layer, and the intermediate layer to one another. The first device layer, the second device layer, and the intermediate layer may be operatively interlocked such that the intermediate layer extends between, and electrically separates, the first electrode and the second electrode.

The operatively pressing at 260 may be performed in any suitable manner. As an example, the operatively pressing at 260 may include applying a first pressing force to the first device layer and concurrently providing a second pressing force to the second device layer. The first pressing force and the second pressing force may be directed toward one another, such as to press and/or to compress the first device layer and the second device layer against the intermediate layer. As a more specific example, the operatively pressing at 260 may include pressing the first device layer, the second device layer, and the intermediate layer between a pair of opposed pressing rollers.

The operatively pressing at 260 may be performed with any suitable timing and/or sequence during methods 200. As an example, methods 200 may be performed as part of a continuous, or at least substantially continuous, manufacturing process. Under these conditions, the defining at 210, the defining at 220, the defining at 230, and the operatively pressing at 260 may be performed concurrently, at least partially concurrently, and/or simultaneously.

The operatively pressing at 260 is schematically illustrated in FIG. 6. As illustrated therein, first device layer 120, second device layer 140, and intermediate layer 160 may be provided to a layered energy storage device pressing structure 300, such as a pair of opposed pressing rollers 302. Layered energy storage device pressing structure 300 may operatively press first device layer 120 and second device layer 140 against opposed sides of intermediate layer 160 to produce and/or define layered energy storage device 100.

In some examples, methods 200 may be utilized to produce and/or generate layered energy storage devices 100 that include a plurality of battery cells. The plurality of battery cells may include at least a first battery cell and a second battery cell, and each battery cell may include a corresponding first device layer, a corresponding second device layer, a corresponding intermediate layer, and a corresponding interlock structure.

In these examples, methods 200 may include defining the corresponding first device layer, the corresponding second device layer, and the corresponding intermediate layer for each battery cell; and methods 200 further may include defining an attachment layer, as indicated at 250 in FIG. 5. The attachment layer may be configured to operatively interconnect the first battery cell and the second battery cell. In these examples, the operatively pressing at 260 additionally may include pressing the first battery cell against a first surface of the attachment layer while concurrently and operatively pressing the second battery cell against an opposed second surface of the attachment layer to operatively interlock the first battery cell and the second battery cell to the attachment layer.

The defining at 250 may be performed in any suitable manner. As an example, the defining at 250 may include defining a sheet of the attachment layer. As another example, the defining at 250 may include utilizing a three-dimensional printing process and/or utilizing a continuous liquid interface printing process to define the attachment layer. It is within the scope of the present disclosure that the defining at 250 may include defining an uncured attachment layer and subsequently curing the uncured attachment layer to define the attachment layer. The curing the uncured attachment layer may include heating the uncured attachment layer, such as via compressing the uncured attachment layer between a pair of heated attachment layer compression rollers. The compressing the uncured attachment layer may include defining at least one fine feature of the attachment layer.

Examples of the plurality of battery cells are disclosed herein with reference to battery cells 104 of FIGS. 2-4. Examples of the first battery cell are disclosed herein with reference to first battery cell 1042 of FIGS. 2-4. Examples of the second battery cell are disclosed herein with reference to second battery cell 1052 of FIGS. 2-4. Examples of the attachment layer are disclosed herein with reference to attachment layer 190 of FIGS. 2-4.

The defining at 250 is schematically illustrated in FIG. 6. As illustrated therein, an additive manufacturing process 340 and/or a continuous liquid interface printing process 342 may be utilized to produce and/or generate an uncured sheet of attachment layer 193. Uncured sheet of attachment layer 193 may be provided to an attachment layer curing structure 344, which may cure the uncured sheet of attachment layer to produce and/or generate attachment layer 190 and/or sheet of attachment layer 191.

FIG. 6 also illustrates that layered energy storage device pressing structure 300 may be configured to receive a plurality of first device layers 120, a plurality of second device layers 140, a plurality of intermediate layers 160, and at least one attachment layer 190 and to operatively press these layers together. This may form and/or define a layered energy storage device 100 that includes a plurality of battery cells 104, as discussed herein. Illustrative, non-exclusive examples of inventive subject matter according to the present disclosure are described in the following enumerated paragraphs:

A1. A layered energy storage device (100), comprising:
a first device layer (120) defining a first electrode (122) of the layered energy storage device (100);
a second device layer (140) defining a second electrode (142) of the layered energy storage device (100);
an intermediate layer (160) that extends between, and electrically separates, the first electrode and the second electrode, wherein the intermediate layer includes an electrolyte material (162) configured to facilitate ion transport between the first electrode and the second electrode; and
an interlock structure (180), wherein the interlock structure is at least partially defined by the first device layer and also by the second device layer, and further wherein the interlock structure is configured to operatively interlock the first device layer, the second device layer, and the intermediate layer to one another.

A2. The device of paragraph A1, wherein the first device layer is at least one of a first curvilinear device layer, a first non-planar device layer, and a first arcuate device layer.

A3. The device of any of paragraphs A1-A2, wherein the first device layer is a planar first device layer that defines a first surface topography that at least partially defines the interlock structure.

A4. The device of any of paragraphs A1-A3, wherein the first device layer includes, and optionally is defined by, a first layer material (124).

A5. The device of paragraph A4, wherein the first layer material includes, and optionally is, at least one of:
(i) an electrically conductive first layer material;
(ii) a metallic first layer material; and
(iii) a copper first layer material.

A6. The device of any of paragraphs A1-A5, wherein the first electrode is a positive electrode (126) of an electrochemical cell (102) that includes the first electrode, the second electrode, and the electrolyte material.

A7. The device of any of paragraphs A1-A6, wherein the first device layer is a monolithic, or unitary, first device layer defined solely by a/the first layer material.

A8. The device of any of paragraphs A1-A7, wherein the first device layer is a composite first device layer defined by a/the first layer material and a first base material (128).

A9. The device of paragraph A8, wherein the first layer material coats the first base material.

A10. The device of any of paragraphs A8-A9, wherein the first base material is a dielectric, or electrically insulating, first base material.

A11. The device of any of paragraphs A1-A10, wherein the second device layer is at least one of a second curvilinear device layer, a second non-planar device layer, and a second arcuate device layer.

A12. The device of any of paragraphs A1-A11, wherein the second device layer is a planar second device layer that defines a second surface topography that at least partially defines the interlock structure.

A13. The device of any of paragraphs A1-A12, wherein the second device layer includes, and optionally is defined by, a second layer material (144).

A14. The device of paragraph A13, wherein the second layer material includes, and optionally is, at least one of:
(i) an electrically conductive second layer material;
(ii) a metallic second layer material; and
(iii) an aluminum second layer material.

A15. The device of any of paragraphs A1-A14, wherein the second electrode is a negative electrode (146) of an/the electrochemical cell that includes the first electrode, the second electrode, and the electrolyte material.

A16. The device of any of paragraphs A1-A15, wherein the second device layer is a monolithic, or unitary, second device layer defined solely by a/the second layer material.

A17. The device of any of paragraphs A1-A16, wherein the second device layer is a composite second device layer defined by a/the second layer material and a second base material (148).

A18. The device of paragraph A17, wherein the second layer material coats the second base material.

A19. The device of any of paragraphs A17-A18, wherein the second base material is a dielectric, or electrically insulating, second base material.

A20. The device of any of paragraphs A1-A19, wherein the second device layer includes an ion host layer (150) for the layered energy storage device, optionally wherein the ion host layer extends between the second electrode and the intermediate layer.

A21. The device of paragraph A20, wherein the ion host layer is a porous ion host layer.

A22. The device of any of paragraphs A20-A21, wherein the ion host layer includes at least one of a ceramic ion host layer and a fibrous ion host layer.

A23. The device of any of paragraphs A20-A22, wherein the ion host layer includes metal ions.

A24. The device of paragraph A23, wherein the metal ions include at least one of lithium ions, sodium ions, zinc ions, nickel ions, iron ions, silicon ions, and germanium ions.

A25. The device of any of paragraphs A1-A24, wherein a/the first layer material of the first electrode differs from a/the second layer material of the second electrode.

A26. The device of any of paragraphs A1-A25, wherein the intermediate layer is defined by at least one of:
(i) an ion-permeable intermediate layer material;
(ii) a dielectric intermediate layer material;
(iii) an electrically insulating intermediate layer material; and
(iv) a structural intermediate layer.

A27. The device of any of paragraphs A1-A26, wherein the intermediate layer includes a plurality of pores (164) configured to facilitate ion transport between the first electrode and the second electrode.

A28. The device of paragraph A27, wherein the plurality of pores defines an effective diameter, or an average effective diameter, of at least one of:

(i) at least 1 Angstrom, at least 2 Angstroms, at least 5 Angstroms, at least 10 Angstroms, at least 20 Angstroms, at least 30 Angstroms, at least 40 Angstroms, at least 50 Angstroms, at least 60 Angstroms, at least 80 Angstroms, or at least 100 Angstroms; and (ii) at most 250 Angstroms, at most 225 Angstroms, at most 200 Angstroms, at most 175 Angstroms, at most 150 Angstroms, at most 125 Angstroms, or at most 100 Angstroms.

A29. The device of any of paragraphs A1-A28, wherein the intermediate layer defines at least a portion of a layered battery (166).

A30. The device of any of paragraphs A1-A29, wherein the intermediate layer includes a plurality of sub-layers (168).

A31. The device of paragraph A30, wherein the plurality of sub-layers includes a plurality of sub-layer electrodes and a plurality of ion-permeable sub-layers, wherein at least one ion-permeable sub-layer in the plurality of ion-permeable sub-layers electrically separates a corresponding adjacent pair of sub-layer electrodes and includes a sub-layer electrolyte material configured to facilitate ion transport between the corresponding adjacent pair of sub-layer electrodes.

A32. The device of any of paragraphs A1-A31, wherein the intermediate layer includes a barrier material that spatially separates the first electrode from the second electrode.

A33. The device of any of paragraphs A1-A32, wherein the intermediate layer includes an ion-permeable ceramic.

A34. The device of any of paragraphs A1-A33, wherein the electrolyte material includes ions dissolved in a solvent.

A35. The device of paragraph A34, wherein the ions include lithium ions.

A36. The device of any of paragraphs A1-A35, wherein the electrolyte material electrically contacts the first electrode and the second electrode.

A37. The device of any of paragraphs A1-A36, wherein the first electrode and the electrolyte material together define a first half-cell potential, wherein the second electrode and the electrolyte material together define a second half-cell potential, and further wherein the first half-cell potential differs from the second half-cell potential.

A38. The device of any of paragraphs A1-A37, wherein the electrolyte material includes at least one of:
(i) a liquid electrolyte material;
(ii) a gel electrolyte material;
(iii) a solid electrolyte material;
(iv) a lattice electrolyte material;
(v) a foam electrolyte material; and
(vi) an electrolyte material that includes a non-Newtonian fluid.

A39. The device of any of paragraphs A1-A38, wherein the interlock structure is configured to maintain direct physical contact between at least a region of the first electrode and a first corresponding region of the intermediate layer.

A40. The device of any of paragraphs A1-A39, wherein the interlock structure is configured to maintain direct physical contact between at least a region of the second electrode and a second corresponding region of the intermediate layer.

A41. The device of any of paragraphs A1-A40, wherein at least a portion of the interlock structure extends through the intermediate layer.

A42. The device of any of paragraphs A1-A41, wherein the intermediate layer defines an aperture (170), and further wherein at least a portion of the interlock structure extends through the aperture.

A43. The device of any of paragraphs A1-A42, wherein a region of the interlock structure that is defined by the first device layer is shaped to at least one of:
(i) define an interference fit with a region of the interlock structure that is defined by the second device layer; and
(ii) form a snap-lock fit with the region of the interlock structure that is defined by the second device layer.

A44. The device of any of paragraphs A1-A43, wherein the interlock structure includes a plurality of interlock sub-structures spaced-apart within the layered energy storage device, wherein each interlock sub-structure in the plurality of interlock sub-structures is configured to operatively interlock a corresponding region of the first device layer, a corresponding region of the second device layer, and a corresponding region of the intermediate layer to one another.

A45. The device of paragraph A44, wherein the plurality of interlock structures defines a repeating pattern across a surface of the layered energy storage device.

A46. The device of any of paragraphs A1-A45, wherein the interlock structure includes:
(i) a recess (184) that is defined by one of the first device layer and the second device layer, wherein the recessed region extends away from the intermediate layer; and
(ii) a projection (186) that is defined by the other of the first device layer and the second device layer, wherein the projection extends through an/the aperture that is defined by the intermediate layer and into the recess.

A47. The device of paragraph A46, wherein the recess includes a recess interlock region (1842), wherein the projection includes a projection interlock region (1862), and further wherein the recess interlock region and the projection interlock region are configured to operatively interlock with one another to operatively interlock the first device layer, the second device layer, and the intermediate layer to one another.

A48. The device of paragraph A47, wherein the recess interlock region includes a recess edge (1844) optionally that extends perpendicular, or at least substantially perpendicular, to an elongate axis of the recess.

A49. The device of any of paragraphs A47-A48, wherein the projection interlock region includes at least one of:
(i) a projection edge (1864) optionally that extends perpendicular, or at least substantially perpendicular to an elongate axis of the projection; and
(ii) a barb (1866).

A50. The device of any of paragraphs A1-A49, wherein the recess is a mushroom-shaped, or an at least partially mushroom-shaped, recess region (1846).

A51. The device of any of paragraphs A1-A50, wherein the projection is a mushroom shaped, or an at least partially mushroom-shaped, projection (1868).

A52. The device of any of paragraphs A1-A51, wherein the recess includes an elongate recess cavity (1848) that extends away from the intermediate layer and an expanded recess region (1850) defined on an end of the elongate recess cavity that is distal the intermediate layer.

A53. The device of paragraph A52, wherein the projection includes an elongate projection shaft (1870) that extends through the intermediate layer and within the elongate recess cavity, and further wherein the projection includes a bulbous projection end (1872) that extends within the expanded recess region.

A54. The device of paragraph A53, wherein a maximum transverse cross-sectional dimension of the bulbous projection end at least one of:

(i) is greater than a maximum transverse cross-sectional dimension of the elongate projection shaft; and (ii) is greater than a maximum transverse cross-sectional dimension of the elongate recess cavity.

A55. The device of any of paragraphs A1-A54, wherein the interlock region operatively interlocks the first device layer, the second device layer, and the intermediate layer without establishing direct electrical contact between the first electrode and the second electrode.

A56. The device of any of paragraphs A1-A55, wherein a region of the one of the first device layer and the second device layer that defines a/the recess is electrically insulating.

A57. The device of any of paragraphs A1-A56, wherein a region of a/the projection that extends into a/the recess is electrically insulating.

A58. The device of any of paragraphs A1-A57, wherein the first device layer, the second device layer, the intermediate layer, and the interlock structure together define a first battery cell (1042) of the layered energy storage device, and further wherein the layered energy storage device includes a second battery cell (1052).

A59. The device of any of paragraphs A1-A58, wherein the layered energy storage device includes a plurality of battery cells (104) including at least a/the first battery cell and a/the second battery cell, wherein each battery cell in the plurality of battery cells includes a corresponding first device layer, a corresponding second device layer, a corresponding intermediate layer, and a corresponding interlock structure.

A60. The device of any of paragraphs A58-A59, wherein the layered energy storage device further includes an attachment layer (190) that operatively interconnects the first battery cell and the second battery cell.

A61. The device of paragraph A60, wherein the attachment layer includes a dielectric attachment layer region (192) that electrically isolates a first isolated region (1044) of the first battery cell from a corresponding second isolated region (1054) of the second battery cell.

A62. The device of any of paragraphs A60-A61, wherein the attachment layer further includes an electrically conductive attachment layer region (194) that electrically interconnects a first connected region of the first battery cell to a corresponding second connected region (1056) of the second battery cell.

A63. The device of paragraph A62, wherein the electrically conductive attachment layer region one of:
(i) electrically interconnects the first electrode of the first battery cell to the second electrode of the second battery cell; and
(ii) electrically interconnects the first electrode of the first battery cell to the first electrode of the second battery cell.

A64. The device of any of paragraphs A60-A63, wherein:
(i) the first battery cell defines a first cell recess (1048) that extends into the first battery cell;
(ii) the second battery cell defines a second cell recess (1058) that extends into the second battery cell;
(iii) the attachment layer includes a first attachment projection (196) that projects into the first cell recess o operatively interlock the first battery cell to the attachment layer; and
(iv) the attachment layer includes a second attachment projection (198) that projections into the second cell recess to operatively interlock the second battery cell to the attachment layer.

A65. The device of paragraph A64, wherein the first attachment projection and the second attachment projection extend in opposite, or at least substantially opposite, directions.

A66. The device of any of paragraphs A64-A65, wherein the first cell recess and the second cell recess both extend away from the attachment layer.

A67. The device of any of paragraphs A1-A66, wherein the layered energy storage device includes, is, or defines a metal ion or a lithium ion battery.

A68. The device of any of paragraphs A1-A67, wherein the layered energy storage device at least partially defines a structural component (12).

A69. The device of paragraph A68, wherein the structural component includes at least one of:
(i) a wing (20) of an aircraft;
(ii) tail assembly (30) of the aircraft;
(iii) a vertical stabilizer (40) of the aircraft;
(iv) a horizontal stabilizer (50) of the aircraft;
(v) an engine (60) of the aircraft;
(vi) a fuselage (70) of the aircraft;
(vii) a spar (80) of the aircraft; and
(viii) a skin (90) of the aircraft.

A70. The device of any of paragraphs A1-A69, wherein the layered energy storage device at least partially defines a/the skin of an/the aircraft.

A71. The device of paragraph A70, wherein the layered energy storage device further includes an external skin layer (110) and a skin interlock structure (112), wherein the external skin layer defines an external surface (14) of the aircraft, and further wherein the skin interlock structure operatively interlocks the external skin layer to at least one of the first device layer, the second device layer, and the intermediate layer.

A72. The device of any of paragraphs A1-A71, wherein the first device layer, the second device layer, the intermediate layer, and the interlock structure are shaped to distribute a load, applied to the layered energy storage device, across at least two, and optionally across at least three, dimensions.

A73. The device of any of paragraphs A1-A72, wherein a thickness (106) of the layered energy storage device, as measured between a surface of the first device layer that is opposed to the first electrode and a surface of the second device layer that is opposed to the second electrode, is at least one of:
(i) at least 0.5 millimeters (mm), at least 0.6 mm, at least 0.7 mm, at least 0.8 mm, at least 0.9 mm, at least 1.0 mm, at least 1.1 mm, at least 1.2 mm, at least 1.3 mm, at least 1.4 mm, or at least 1.5 mm; and
(ii) at most 5 mm, at most 4.5 mm, at most 4 mm, at most 3.5 mm, at most 3 mm, at most 2.5 mm, at most 2.25 mm, at most 2.0 mm. at most 1.9 mm, at most 1.8 mm, at most 1.7 mm, or at most 1.6 mm.

A74. The device of any of paragraphs A1-A73, wherein the layered energy storage device further includes at least one cavity (108), optionally wherein at least one of:
(i) the at least one cavity is sized to provide a desired level of mechanical flexibility within the layered energy storage device; and
(ii) the at least one cavity is positioned to provide the desired level of mechanical flexibility within the layered energy storage device.

B1. A method (200) of forming the layered energy storage device of any of paragraphs A1-A74, the method comprising:
defining the first device layer;

defining the second device layer;
defining the intermediate layer; and
operatively pressing the first device layer against a first surface of the intermediate layer while concurrently and operatively pressing the second device layer against an opposed second surface of the intermediate layer to engage the interlock structure and operatively interlock the first device layer, the second device layer, and the intermediate layer to one another such that the intermediate layer extends between, and electrically separates, the first electrode and the second electrode.

B2. The method of paragraph B1, wherein the method includes simultaneously performing the defining the first device layer, the defining the second device layer, the defining the intermediate layer, and the operatively pressing.

B3. The method of any of paragraphs B1-B2, wherein the defining the first device layer includes defining a sheet (121) of the first device layer.

B4. The method of any of paragraphs B1-B3, wherein the defining the first device layer includes forming a first base (127) from a/the first base material and subsequently covering the first base with a/the first layer material to define the first electrode.

B5. The method of paragraph B4, wherein the forming the first base includes at least one of:
 (i) utilizing an additive manufacturing process to form the first base;
 (ii) utilizing a continuous liquid interface printing process to form the first base;
 (iii) utilizing a metal stamping process to form the first base;
 (iv) utilizing a rolling process to form the first base;
 (v) utilizing an extruding process to form the first base;
 (vi) utilizing a metal forming process to form the first base; and
 (vii) utilizing a metal expanding process to form the first base.

B6. The method of any of paragraphs B4-B5, wherein the forming the first base includes forming an uncured first base and subsequently curing the uncured first base to form the first base.

B7. The method of paragraph B6, wherein the curing the uncured first base includes heating the uncured first base.

B8. The method of any of paragraphs B6-B7, wherein the curing the uncured first based includes compressing the uncured first base between a pair of heated first base compression rollers.

B9. The method of paragraph B8, wherein the method further includes defining at least one fine feature of the first base responsive to the compressing the uncured first base between a pair of heated first base compression rollers.

B10. The method of any of paragraphs B4-B9, wherein the covering the first base with the first layer material includes at least one of:
 (i) coating the first base with the first layer material;
 (ii) electroplating the first base with the first layer material; and
 (iii) pressing a film, or a foil, of the first layer material against the first base.

B11. The method of any of paragraphs B1-B10, wherein the defining the second device layer includes defining a sheet (141) of the second device layer.

B12. The method of any of paragraphs B1-B11, wherein the defining the second device layer includes forming a second base (147) from a/the second base material and subsequently covering the second base with a/the second layer material to define the first electrode.

B13. The method of paragraph B12, wherein the forming the second base includes at least one of:
 (i) utilizing a/the additive manufacturing process to form the second base;
 (ii) utilizing a/the continuous liquid interface printing process to form the second base;
 (iii) utilizing a/the metal stamping process to form the second base;
 (iv) utilizing a/the rolling process to define the form base;
 (v) utilizing an/the extruding process to form the second base;
 (vi) utilizing a/the metal forming process to form the second base; and
 (vii) utilizing a/the metal expanding process to form the second base.

B14. The method of any of paragraphs B12-B13, wherein the forming the second base includes forming an uncured second base and subsequently curing the uncured second base to form the second base.

B15. The method of paragraph B14, wherein the curing the uncured second base includes heating the uncured second base.

B16. The method of any of paragraphs B14-B15, wherein the curing the uncured second based includes compressing the uncured second base between a pair of heated second base compression rollers.

B17. The method of paragraph B16, wherein the method further includes defining at least one fine feature of the second base responsive to the compressing the uncured second base between a pair of heated second base compression rollers.

B18. The method of any of paragraphs B12-B17, wherein the covering the second base with the second layer material includes at least one of:
 (i) coating the second base with the second layer material;
 (ii) electroplating the second base with the second layer material; and
 (iii) pressing a film of the second layer material against the second base.

B19. The method of any of paragraphs B1-B18, wherein the method further includes forming an/the ion host layer on the second electrode.

B20. The method of paragraph B19, wherein the forming the ion host layer includes pressing the ion host layer against the second electrode.

B21. The method of any of paragraphs B19-B20, wherein the forming the ion host layer includes heating the ion host layer to cure the ion host layer.

B22. The method of any of paragraphs B1-B21, wherein the method further includes positioning the electrolyte material within the intermediate layer.

B23. The method of paragraph B22, wherein the positioning is at least one of:
 (i) subsequent to the operatively pressing; and
 (ii) prior to the operatively pressing.

B24. The method of any of paragraphs B1-B23, wherein the defining the intermediate layer includes at least one of:
 (i) defining a sheet of intermediate layer material; and
 (ii) providing the sheet of intermediate layer material.

B25. The method of paragraph B24, wherein the defining the intermediate layer includes pressing the sheet of intermediate layer material between a pair of opposed intermediate layer rollers.

B26. The method of paragraph B25, wherein the pressing the sheet of intermediate material includes defining at least one feature within the sheet of intermediate layer material.

B27. The method of paragraph B26, wherein the at least one feature includes an/the aperture.

B28. The method of any of paragraphs B1-B27, wherein the operatively pressing includes applying a first pressing force to the first device layer and concurrently applying a second pressing force to the second device layer.

B29. The method of any of paragraphs B1-B28, wherein the operatively pressing includes pressing the first device layer, the second device layer, and the intermediate layer between a pair of opposed pressing rollers.

B30. The method of any of paragraphs B1-B29, wherein the layered energy storage device includes a plurality of battery cells including at least a/the first battery cell and a/the second battery cell, wherein each battery cell in the plurality of battery cells includes a corresponding first device layer, a corresponding second device layer, a corresponding intermediate layer, and a corresponding interlock structure, wherein the method includes defining the corresponding first device layer, the corresponding second device layer, and the corresponding intermediate layer of each battery cell, wherein the method includes defining an/the attachment layer that is configured to operatively interconnect the first battery cell and the second battery cell, and further wherein the operatively pressing includes pressing the first battery cell against a first surface of the attachment layer while concurrently and operatively pressing the second battery cell against an opposed second surface of the attachment layer to operatively interlock the first battery cell and the second battery cell to the attachment layer.

B31. The method of paragraph B30, wherein the defining the attachment layer includes defining a sheet of the attachment layer.

B32. The method of any of paragraphs B30-B31, wherein the defining the attachment layer includes at least one of:
(i) utilizing a three-dimensional printing process to define the attachment layer; and
(ii) utilizing a continuous liquid interface printing process to define the attachment layer.

B33. The method of any of paragraphs B30-B32, wherein the defining the attachment layer includes defining an uncured attachment layer and subsequently curing the uncured attachment layer to define the attachment.

B34. The method of paragraph B33, wherein the curing the uncured attachment layer includes heating the uncured attachment layer.

B35. The method of any of paragraphs B33-B34, wherein the curing the uncured attachment layer includes compressing the uncured attachment layer between a pair of heated attachment layer compression rollers.

B36. The method of paragraph B35, wherein the method further includes defining at least one fine feature of the attachment layer responsive to the compressing the uncured attachment layer between the pair of heated attachment layer compression rollers.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A layered energy storage device, comprising:
 a first device layer defining a first electrode of the layered energy storage device;
 a second device layer defining a second electrode of the layered energy storage device, wherein a first layer material of the first electrode differs from a second layer material of the second electrode;
 an intermediate layer that extends between, and electrically separates, the first electrode and the second electrode, wherein the intermediate layer includes an electrolyte material configured to facilitate ion transport between the first electrode and the second electrode; and
 an interlock structure, wherein the interlock structure is at least partially defined by the first device layer and also by the second device layer, and further wherein the interlock structure is configured to operatively interlock the first device layer, the second device layer, and the intermediate layer to one another;
 wherein the layered energy storage device includes a plurality of battery cells including at least a first battery cell and a second battery cell, wherein each battery cell in the plurality of battery cells includes a corresponding first device layer, a corresponding second device layer, a corresponding intermediate layer, and a corresponding interlock structure; and
 further wherein:
  (i) the first battery cell defines a first cell recess that extends into the first battery cell;
  (ii) the second battery cell defines a second cell recess that extends into the second battery cell;
  (iii) an attachment layer including a first attachment projection that projects into the first cell recess to operatively interlock the first battery cell to the attachment layer; and
  (iv) the attachment layer includes a second attachment projection that projects into the second cell recess to operatively interlock the second battery cell to the attachment layer.

2. The layered energy storage device of claim 1, wherein the first device layer is a composite first device layer defined by the first layer material and a first base material, wherein the first layer material coats the first base material, and further wherein the first base material is a dielectric first base material.

3. The layered energy storage device of claim 1, wherein the second device layer includes an ion host layer for the layered energy storage device, wherein the ion host layer extends between the second device layer and the intermediate layer.

4. The layered energy storage device of claim 1, wherein the intermediate layer includes a plurality of pores configured to facilitate ion transport between the first electrode and the second electrode.

5. The layered energy storage device of claim 1, wherein the intermediate layer defines at least a portion of a layered battery construction for the plurality of battery cells, wherein the intermediate layer includes a plurality of sub-layers, and further wherein the plurality of sub-layers includes a plurality of sub-layer electrodes and a plurality of ion-permeable sub-layers, wherein each ion-permeable sub-layer electrically separates a corresponding adjacent pair of sub-layer electrodes and includes a sub-layer electrolyte material configured to facilitate ion transport between the corresponding adjacent pair of sub-layer electrodes.

6. The layered energy storage device of claim 1, wherein the electrolyte material includes ions dissolved in a solvent, and further wherein the ions include metal ions.

7. The layered energy storage device of claim 1, wherein the first electrode and the electrolyte material together define a first half-cell potential, wherein the second electrode and the electrolyte material together define a second half-cell potential, and further wherein the first half-cell potential differs from the second half-cell potential.

8. The layered energy storage device of claim 1, wherein the intermediate layer defines an aperture, and further wherein at least a portion of the interlock structure extends through the aperture.

9. The layered energy storage device of claim 1, wherein the interlock structure includes:
 (i) a recess that is defined by one of the first device layer and the second device layer, wherein the recess extends away from the intermediate layer; and
 a projection that is defined by the other of the first device layer and the second device layer, wherein the projection extends through an aperture that is defined by the intermediate layer and into the recess.

10. The layered energy storage device of claim 9, wherein the recess includes a recess interlock region, wherein the projection includes a projection interlock region, and further wherein the recess interlock region and the projection interlock region are configured to operatively interlock with one another to operatively interlock the first device layer, the second device layer, and the intermediate layer to one another.

11. The layered energy storage device of claim 10, wherein the recess interlock region includes a recess edge that extends at least substantially perpendicular to an elongate axis of the recess.

12. The layered energy storage device of claim 10 wherein the projection interlock region includes at least one of:
 (i) a projection edge that extends at least substantially perpendicular to an elongate axis of the projection; and
 (ii) a barb.

13. The layered energy storage device of claim 9, wherein the recess includes an elongate recess cavity that extends away from the intermediate layer and an expanded recess region defined on an end of the elongate recess cavity that is distal the intermediate layer.

14. The layered energy storage device of claim 13, wherein the projection includes an elongate projection shaft that extends through the intermediate layer and within the elongate recess cavity, and further wherein the projection includes a bulbous projection end that extends within the expanded recess region, and further wherein a maximum transverse cross-sectional dimension of the bulbous projection end at least one of:
 (i) is greater than a maximum transverse cross-sectional dimension of the elongate projection shaft; and
 (ii) is greater than a maximum transverse cross-sectional dimension of the elongate recess cavity.

15. The layered energy storage device of claim 1, wherein the attachment layer operatively interconnects the first battery cell and the second battery cell.

16. The layered energy storage device of claim 15, wherein the attachment layer further includes an electrically conductive attachment layer region that electrically interconnects a connected region of the first battery cell to a corresponding connected region of the second battery cell.

17. The layered energy storage device of claim 1, wherein the layered energy storage device defines a lithium ion battery.

18. The layered energy storage device of claim 1, wherein the layered energy storage device at least partially defines a structural component, wherein the structural component includes at least one of:
   (i) a wing of an aircraft;
   (ii) tail assembly of the aircraft;
   (iii) a vertical stabilizer of the aircraft;
   (iv) a horizontal stabilizer of the aircraft;
   (v) an engine of the aircraft;
   (vi) a fuselage of the aircraft;
   (vi) a spar of the aircraft; and
   (viii) a skin of the aircraft.

19. The layered energy storage device of claim 1, wherein the layered energy storage device at least partially defines a skin of an aircraft, wherein the layered energy storage device further includes an external skin layer and a skin interlock structure, wherein the external skin layer defines an external surface of the aircraft, and further wherein the skin interlock structure operatively interlocks the external skin layer to at least one of the first device layer, the second device layer, and the intermediate layer.

20. A layered energy storage device, comprising:
   a first device layer defining a first electrode of the layered energy storage device;
   a second device layer defining a second electrode of the layered energy storage device, wherein a first layer material of the first electrode differs from a second layer material of the second electrode;
   an intermediate layer that extends between, and electrically separates, the first electrode and the second electrode, wherein the intermediate layer includes an electrolyte material configured to facilitate ion transport between the first electrode and the second electrode; and
   an interlock structure, wherein the interlock structure is at least partially defined by the first device layer and also by the second device layer, and further wherein the interlock structure is configured to operatively interlock the first device layer, the second device layer, and the intermediate layer to one another;
   wherein the layered energy storage device at least partially defines a skin of an aircraft, wherein the layered energy storage device further includes an external skin layer and a skin interlock structure, wherein the external skin layer defines an external surface of the aircraft, and further wherein the skin interlock structure operatively interlocks the external skin layer to at least one of the first device layer, the second device layer, and the intermediate layer.

21. The layered energy storage device of claim 20, wherein the interlock structure includes:
   (i) a recess that is defined by one of the first device layer and the second device layer, wherein the recess extends away from the intermediate layer; and
   (ii) a projection that is defined by the other of the first device layer and the second device layer, wherein the projection extends through an aperture that is defined by the intermediate layer and into the recess.

22. The layered energy storage device of claim 21, wherein the recess includes a recess interlock region, wherein the projection includes a projection interlock region, and further wherein the recess interlock region and the projection interlock region are configured to operatively interlock with one another to operatively interlock the first device layer, the second device layer, and the intermediate layer to one another.

23. The layered energy storage device of claim 21, wherein the recess includes an elongate recess cavity that extends away from the intermediate layer and an expanded recess region defined on an end of the elongate recess cavity that is distal the intermediate layer.

24. The layered energy storage device of claim 23, wherein the projection includes an elongate projection shaft that extends through the intermediate layer and within the elongate recess cavity, and further wherein the projection includes a bulbous projection end that extends within the expanded recess region, and further wherein a maximum transverse cross-sectional dimension of the bulbous projection end at least one of:
   (i) is greater than a maximum transverse cross-sectional dimension of the elongate projection shaft; and
   (ii) is greater than a maximum transverse cross-sectional dimension of the elongate recess cavity.

25. A layered energy storage device, comprising:
   a first device layer defining a first electrode of the layered energy storage device;
   a second device layer defining a second electrode of the layered energy storage device, wherein a first layer material of the first electrode differs from a second layer material of the second electrode;
   an intermediate layer that extends between, and electrically separates, the first electrode and the second electrode, wherein the intermediate layer includes an electrolyte material configured to facilitate ion transport between the first electrode and the second electrode; and
   an interlock structure, wherein the interlock structure is at least partially defined by the first device layer and also by the second device layer, wherein the interlock structure is configured to operatively interlock the first device layer, the second device layer, and the intermediate layer to one another, and further wherein the interlock structure includes:
   (i) a recess that is defined by one of the first device layer and the second device layer, wherein the recess extends away from the intermediate layer; and
   (ii) a projection that is defined by the other of the first device layer and the second device layer, wherein the projection extends through an aperture that is defined by the intermediate layer and into the recess;
   wherein the recess includes an elongate recess cavity that extends away from the intermediate layer and an expanded recess region defined on an end of the elongate recess cavity that is distal the intermediate layer; and
   wherein the projection includes an elongate projection shaft that extends through the intermediate layer and within the elongate recess cavity, and further wherein the projection includes a bulbous projection end that extends within the expanded recess region, and further wherein a maximum transverse cross-sectional dimension of the bulbous projection end at least one of:
   (ii) is greater than a maximum transverse cross-sectional dimension of the elongate projection shaft; and
   (ii) is greater than a maximum transverse cross-sectional dimension of the elongate recess cavity.

* * * * *

UNITED STATES PATENT AND TRADEMARK OFFICE
CERTIFICATE OF CORRECTION

| | |
|---|---|
| PATENT NO. | : 11,444,312 B2 |
| APPLICATION NO. | : 16/282034 |
| DATED | : September 13, 2022 |
| INVENTOR(S) | : Roger D. Bernhardt |

It is certified that error appears in the above-identified patent and that said Letters Patent is hereby corrected as shown below:

In the Claims

Column 26, Line 24 of Claim 9, insert --(ii)-- at left margin before text "a projection that is defined...".

Column 28, Line 62 of Claim 25, "(ii)" at left margin should be changed to --(i)--.

Signed and Sealed this
Seventeenth Day of January, 2023

Katherine Kelly Vidal
*Director of the United States Patent and Trademark Office*